United States Patent

[11] 3,562,532

[72] Inventors Michael ... Santoro
Newtown Square;
Stephen Boyko, Phoenixville, Pa.
[21] Appl. No. 678,269
[22] Filed Oct. 26, 1967
[45] Patented Feb. 9, 1971
[73] Assignee Automation Industries, Inc.
a corporation of California. by mesne assignments

[54] METHOD AND MEANS FOR CHANGING RADIOACTIVE SOURCES
1 Claim, 5 Drawing Figs.
[52] U.S. Cl. .................................... 250/106, 250/108
[51] Int. Cl. .................................... G21f 5/00
[50] Field of Search ............................ 250/106, 106.5, 108

[56] References Cited
UNITED STATES PATENTS
| | | | |
|---|---|---|---|
| 3,147,383 | 9/1964 | Prest ........................... | 250/106X |
| 3,170,065 | 2/1965 | Prest ........................... | 250/106 |

*Primary Examiner*—Archie R. Borchelt
*Attorney*—Dan R. Sadler

ABSTRACT: Method and means are provided to permit use of a radioactive source capsule with storage units of different sizes. An extension cable is detachably connected to a main cable holding the source capsule. The extension cable is detached from the main cable when the source capsule is disposed within the smaller unit and is attached to the main cable when the source capsule is disposed within the larger unit.

PATENTED FEB 9 1971 3,562,532

INVENTORS
STEPHEN BOYKO
BY  MICHAEL P. SANTORO

*Edward M Farrell*
ATTORNEY 3,562,532

METHOD AND MEANS FOR CHANGING RADIOACTIVE SOURCES

BACKGROUND OF THE INVENTION

1. Field of the Invention

The use of radiographic equipment for testing is well known. In such equipment, strong radioactive sources are used to radiate energy to and through an object to be examined. The radioactive source is generally exposed at a remote point from an operator while radiographs are taken of the object. The resulting radiographs are then examined to detect flaws or other characteristics within the object tested.

2. Description of the Prior Art

Between exposures of the radioactive sources capsules, it is necessary that the sources capsules be properly shielded. Shielding or storage devices have generally included chambers arranged in tortuous paths which provide storage of the sources capsules as well as providing means to permit the sources to be propelled out of the shielding devices by suitable control elements.

Different types of testing may require radioactive sources capsules of different strengths. For example, a 100 curie source capsule may be required for one type of testing. On the other hand, a 30 curie source capsule may be sufficient for other types of testing. It is common practice for users of radiographic equipment to have a plurality of storage devices for storing sources capsules of different strengths. The reason for this is that the test specimens may be of different densities or thicknesses thereby requiring radioactive sources capsules of different strengths.

Generally, a 100 curie source capsule requires a much larger shield than a shield required for a 30 curie source capsule. When the strength of a radioactive source capsule decays to a low unusable level, it is customary to return a storage device containing the source to the supplier to permit a new source capsule to be inserted in place of the decayed source capsule. The storage device may be the storage device used in connection with the testing or may be one used for transport. In a case where a 100 curie source capsule, for example, has decayed to 30 curies, the decayed source capsule may still have application for testing which involves this relatively low energy. It would be desirable therefore to permit a user to continue to use the partly decayed source capsule and not return it with the storage unit to the supplier.

SUMMARY

In accordance with the present invention, a method and means are provided to permit transfer of a radioactive source capsule from a relatively large storage device to a relatively small storage device. The radioactive source capsule is connected to a main cable or pigtail. An extension cable is detachably connected to the main cable to permit insertion of the source capsule within the large storage device requiring a relatively long cable. When the radioactive source capsule is moved into the small storage device, the extension cable is removed from the main cable to permit the radioactive source capsule to be safely positioned within the small unit which requires a relatively short cable.

BRIEF DESCRIPTION OF THE DRAWINGS

Other objects and advantages of the present invention will be apparent and suggest themselves to those skilled in the art, from a reading of the following specification and claims, in conjunction with the drawings in which:

DESCRIPTION OF A PREFERRED EMBODIMENT

Figure 1:
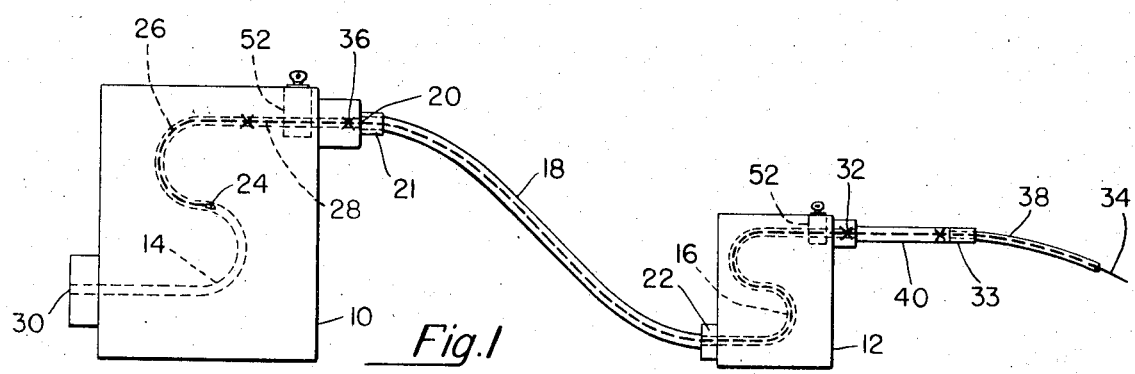
FIG. 1 is a sketch illustrating schematically the main components of the present invention.

The storage devices 10 and 12 are normally used independently of each other and the arrangement illustrated in FIG. 1 is used only when it is desired to change sources capsules from one storage device to the other. When the storage devices are used separately, a control cable is used to transport the radioactive source capsule to and from the associated tortuous chamber or shielded areas. Such means are well known and are not related to the subject invention.

Referring particularly to FIG. 1, a relatively large storage device 10 and a relatively small storage device 12 include tortuous chambers or shielded areas 14 and 16, respectively. Each of the storage devices illustrated are conventional and include inlet and outlet ports leading to the tortuous chambers or shielded areas for propelling and exposing the source capsule.

A flexible tubing or conduit 18 is connected from the control or inlet propelling port 20 of the device 10 to the exit or outlet port 22 of the device 12 when it is desired to transfer a source capsule from the device 10 to the device 12. The tubing 18 may be connected by means of conventional mechanical connecting devices, such as threaded connector members for example.

Before describing the source capsule transfer in detail, the normal uses of the storage devices 10 and 12 will be discussed briefly. These uses are illustrated in FIGS. 2a and 2b.

During normal operations, the storage device 10 is used to store a radioactive source capsule 24 except when the source is exposed for test purposes. Between exposures, the radioactive source capsule 24 must be disposed within the storage device 10 at a position so as to shield or minimize the radiation from the source capsule. The safe position of the source capsule 24 within the storage device is generally predetermined by the length of the cable to which the source capsule is connected.

Figure 2A:
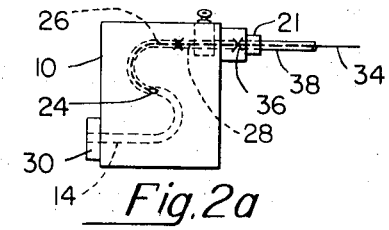
FIGS. 2a and 2b illustrate storage devices when they are in use in the normal manner.

Referring to FIG. 2a, a main cable 26 and an extension cable 28 are connected to each other to provide a total length of the same length as a conventional cable used heretofore. Thus the two cables 26 and 28 may be considered as a single conventional cable and used in the same manner as those used heretofore. In such conventional arrangements, the cable is prevented from moving out of the inlet by locking means of a type to be described. At the same time, a control cable 34 may be used to push the radioactive source capsule 24 out of the device 10 through an exposure outlet 30 by the control cable 34 to expose the source capsule to an object under test. The control cable 34 is connected to the storage device 10 through a connector 21 which is dimensioned to limit the movement of the cables 26 and 28 and prevent the source capsule 24 from being pulled out of the storage unit 10.

Figure 2B:
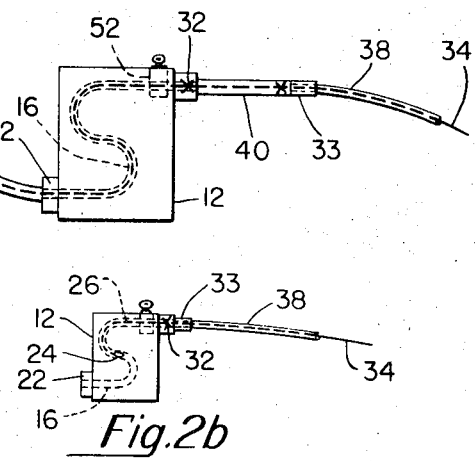

In like manner, as illustrated in FIG. 2b, the storage device 12 may normally be used in a conventional manner wherein a radioactive source capsule of smaller strength is stored. In such conventional use, the source capsule is stored within the tortuous chamber shielded area or path 16. The position of the source capsule within the chamber is determined by the length of the cable to which the radioactive source capsule is connected. In such conventional systems the cable 26 holding the source capsule is shorter in length than the cable normally required for holding the source capsule within the larger storage unit 10.

When the storage device 12 is used in a conventional manner the cable 26 is used without the extension cable 28. The radioactive source capsule within the storage device 12 may be transported by the control cable 34 connected through a connector 33 to the cable 26 through the propelling inlet 32. The control cable 34 may be operated by an operator actuating a reel in a conventional manner. Again, the connector 33 is dimensioned to permit forward movement of the cable 34 but limits its backward movement. Such connectors are conventional.

Insofar as the normal operations of the storage devices 10 and 12 are concerned, there will be no connection between the two storage devices. It is only when the radiation source capsule 24 within the storage device 10 has decayed to a predetermined level that the present invention as illustrated in FIG. 1 is used. In this case, it is desirable to transfer the radioactive source 24 from the tortuous chamber shielded 14 of the device 10 to the tortuous chamber shielded area 16 of the device 12. This eliminates the necessity of returning the storage device 10 along with the decayed radioactive source capsule 24 for replacement of the source. This permits continued use of the source capsule 24 for applications requiring relatively low radiation.

Referring to FIG. 1, assume that the source capsule 24 has decayed from 100 curies to 30 curies and it is desired to transfer it from the storage device 10 to the storage device 12 to permit further use of the source capsule. Thus the device 10 has the source capsule 24 and its associated cables 26 and 28 therein and the device 12 is empty. The first step that must be taken is to disconnect a control cable 34 which normally would be mechanically attached to the extension cable 28 at point 36. Such mechanical attaching means may take a number of different forms well known to those skilled in the art. The control cable 34 is that cable normally attached to a reel which is manually operated to eject or withdraw the radiation source capsule 24 from the tortuous chamber shielded area 14. Such a push-pull control cable, coaxial in nature, is also well known to those skilled in the art and generally involves a relatively stiff wire movable with a tubular shield.

An extension tube 40, corresponding in length to the extension cable 28 is attached to the inlet propelling port 32 of the storage device 12. The cable 34 along with a shield 38 is then attached to the extension tube 40 by suitable mechanical means, such as by a screw or clamping arrangement.

This extension tube 40 allows for the slack in cable 34 due to the extra added by the extension cable 28.

The tubing 18 is then attached at one end to the outlet port 22 of the small storage device 12. The control cable 34 is then pushed within its shield, through the extension tube 40, through the tortuous chamber shielded area 16, out of the outlet port 22 and through the connecting tube 18. The end of the control cable 34 is then mechanically attached to the extension cable 28 at point 36. The tubing 18 is then mechanically connected to the outlet port 20. The system is now ready to permit the removal of the source capsule 24 from the tortuous chamber or shielded area 14 of the device 10 into the tortuous chamber or shielded area 16 of the device 12.

After all the connections have been made in accordance with the manner illustrated and described, the control cable 34 is actuated by an operator at a remote point to pull the source capsule 24 out of the device 10, through the connecting tubing 18 and into the tortuous chamber or shielded area 16 of the device 12.

The distance moved by the source capsule 24 into the tortuous chamber or shielded area 16 is limited by means to be described so that the source capsule 24 is safely disposed within the tortuous chamber or shielded area 16 so as to minimize radiation from the storage device 12. After the source capsule 24 is safely disposed within the device 12, the tubing 18 is removed from the outlet port 22.

If desirable, after the source capsule 24 has been safely inserted into the tortuous chamber or shielded area 16, the extension tube 40 may be removed from the outlet port 32. This permits the extension cable 28 to be mechanically detached from the main cable 26. After removal of the extension cable 28 from the control cable 34, the control cable 34 with its shield 38 may be connected to the main cable 26 and mechanically connected to the inlet port 32. While the extension cable 28 and the extension tube 40 are normally removed from the system after the radiation source capsule 24 has been transferred, in some cases it may be desirable to leave the extension tube 40 and the extension cable 28 in the system without adversely affecting the operation.

In order for the source capsule 24 to be safely disposed within the tortuous chambers or shielded areas 14 or 16 of the storage devices to minimize radiation, the cables holding the source capsule 24 include various locking elements to prevent the source capsule 24 from being accidentally pulled out of the storage devices 10 or 12. This feature is conventional and is described in connection with FIG. 5.

Figure 3:
FIG. 3 illustrates a main cable having a radioactive source capsule attached thereto, in accordance with the present invention.

Referring particularly to FIG. 3, the main cable 26 includes the source capsule 24 suitably connected thereto. A ball 42 is connected to the main cable 26 to engage the locking mechanism to be described. A connector element 44 is connected to the free end of the main cable 26. This disconnect element is adapted to be connected to the control cable or to an adapter or to an adapter cable 26 depending upon whether the source capsule 24 is disposed within the large or small storage device 10 or 12.

Figure 4:
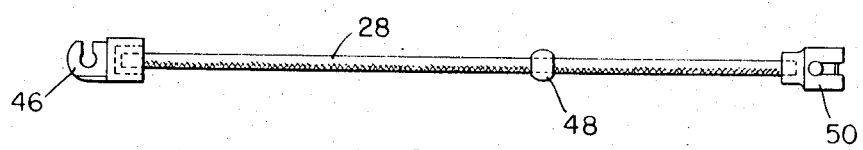
FIG. 4 illustrates an extension cable for connection to the main cable of FIG. 3, in accordance with the present invention.

Referring particularly to FIG. 4, the extension cable 28 includes a connector element 46 at one end which is adapted to hook on to the connector 44 of the cable 26 when the source capsule 24 is within the storage device 10. A ball 48 is connected to cable extension 28 to provide means to engage a locking mechanism, as will be described in connection with FIG. 5. An end connector element 50, similar to the connector 44 of the cable 26, is provided to be mechanically connected to the control cable 34 (FIG. 1). The total length of the cable 26 and the extension cable 28 is such that the source capsule 24 will be safely disposed within the large storage device 10 when the ball 48 engages the locking mechanism 52. The length of the main cable 26 is such that the radioactive source capsule 24 will be safely disposed within the smaller storage device 12 when the ball 42 engages the locking mechanism within the device.

The end of the control cable 34 includes a connector element (not shown) adapted to hook on to the connector element 44 or 50 depending upon the storage device that includes the source capsule 24.

Figure 5:
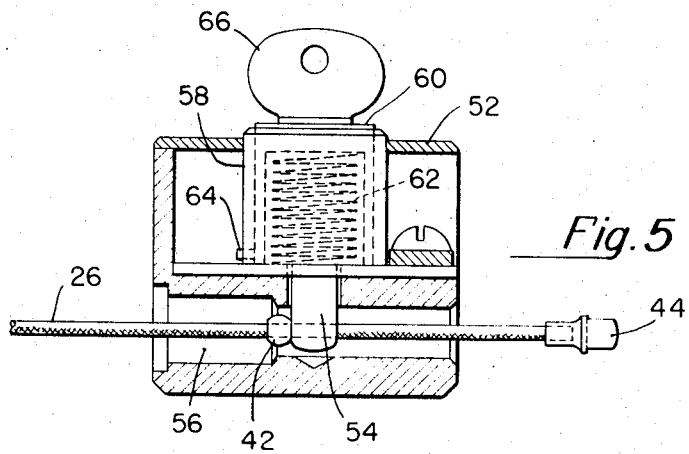
FIG. 5 is a cross-sectional view of a locking mechanism of the type which may be used in the present invention.

Referring particularly to FIG. 5, a locking mechanism 52 is of a type which may be employed in connection with either of the storage devices 10 or 12. The mechanism includes a port or slot opening 56 adapted to receive a main cable 26 (or cable extension 28) therethrough.

The top portion of the lock mechanism involving a plunger type arrangement includes a cylindrical chamber 58 adapted to receive a slidable hollow member 60 therein. A spring 62 is disposed within the member 60 and is compressed with the member 60 in a down position. A latch element 64 is normally biased outwardly to extend through a slot opening located towards the bottom of the cylindrical chamber 58.

The member 60 may be manually depressed until the latch 64 extends through the slot opening thereby locking the member 60 in the down position. A key 66 may be used to overcome the bias against the latch to move it into the cylindrical chamber. When this occurs, the spring 62 forces the member 60 to an up or open position.

A pair of spaced prong elements 54 (only one of which is illustrated) is connected to be moved up and down into the opening 56 past the extension cable 26 (or main cable 28). The spacing between the prongs 52 is wider than the diameter of either of the cables 26 or 28 to permit it to pass therethrough. At the same time, the spacing between the prongs 54 is less than the width of the ball element 42 (or 48). Consequently, when the prongs 54 are in the down position, the cable 26 (or 28) cannot be pulled through the opening 56.

When the source capsule 24 is within the storage device 12, the ball 42 engages the prongs 54 with the length of the main cable 26 being such that the radioactive source capsule 24 is safely disposed within the tortuous chamber 16. When the source capsule 24 is within the storage device 10 and the cable 26 is attached to the extension cable 28, the ball 48 engages the prongs 54, with the total length of the cables 26 and 28 being such that the radioactive source 24 is safely disposed within the tortuous chamber or shielded area 14.

As mentioned, the connectors 21 and 33 are dimensioned to prevent the source capsule 24 from being pulled out of the storage units. The end connectors 44 and 50 are dimensioned too large to pass through the connectors 21 and 33. However, the end connectors 44 and 50 are small enough to pass through the tortuous chambers or shielded areas 14 and 16. Such connectors 21 and 33 may be simple screw type arrangements well known to those skilled in the art and are only incidentally related to the present invention.

It is apparent that the subject invention may take a variety of different forms. For example, it is possible that more than two storage devices may be involved requiring the use of more than one extension cable. Thus, the present invention provides a form of universal cable capable of being used with storage devices of widely different sizes.

We claim:

1. A method of transferring a radioactive source capsule from a first storage medium to a smaller second storage medium when the source capsule has decayed below its accepted use in the first storage medium, each of the storage mediums having a first inlet opening and a second inlet opening leading into a shielded area therein, the method comprising the steps of:

providing a main cable connected to the radioactive capsule in the first storage medium, the main cable including a relatively shorter extension cable, said main cable and said connected extension cable being extended into the first storage medium whereby the radioactive source capsule is disposed within the shielded area of the first storage device to minimize radiation from said capsule;

connecting a conduit between the first opening of the second storage medium and the second opening of the first storage medium, an extension conduit of substantially the same length as said extension cable being connected to the inlet of the first extension cable;

inserting a control cable through the extension tube and the shielded area of the second storage medium and a connecting conduit;

connecting the control cable to said extension cable;

actuating the control cable to pull the source capsule out of the first storage medium through the connecting conduit and into the shielded area of the second storage medium whereby the extension cable is received into the extension conduit when the source capsule is disposed within the shielded area of the second storage medium;

disconnecting the extension conduit between the first opening of the second storage medium and the second opening of the first storage medium;

disconnecting the extension cable and the control cable from the main cable; and securing the main cable within said second storage medium.